Sept. 8, 1953
A. POLLAK
2,651,337
RIP FENCE FOR SAW TABLES AND MOUNTINGS THEREFOR
Filed Jan. 24, 1949
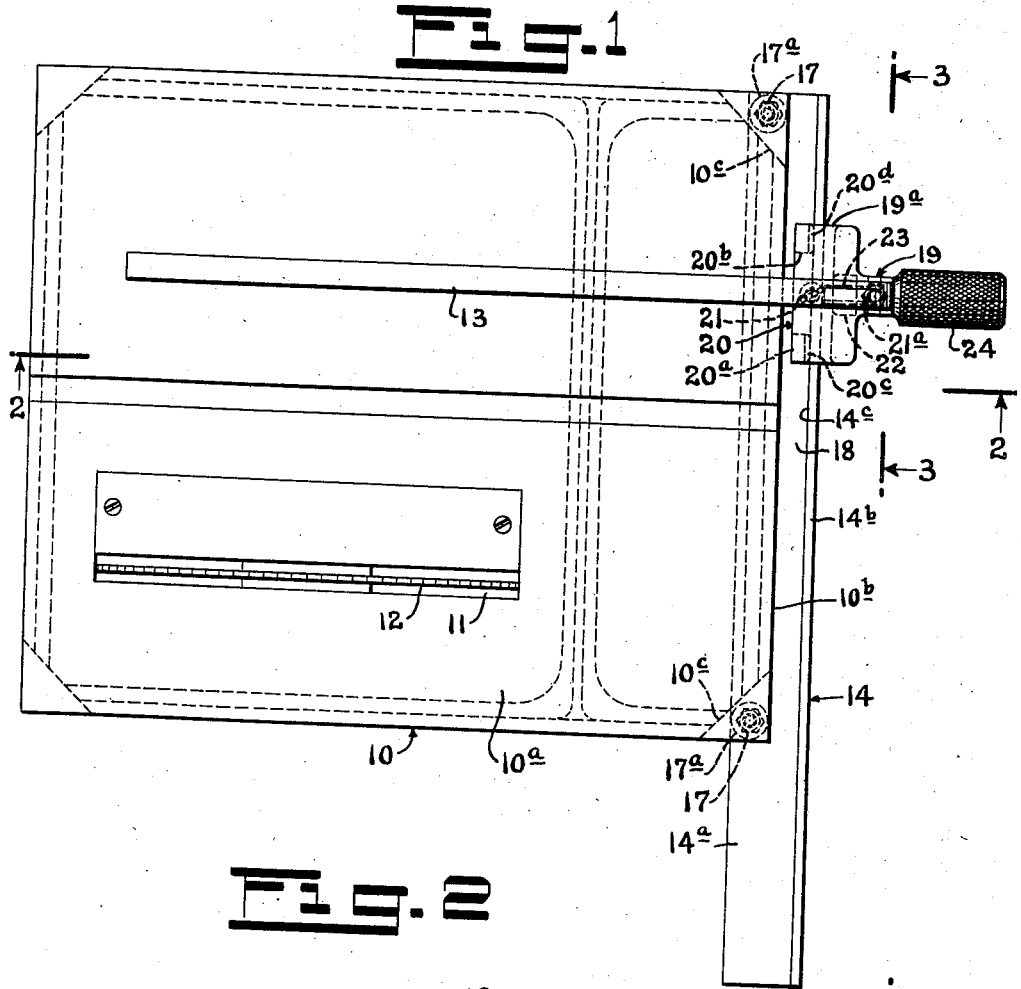
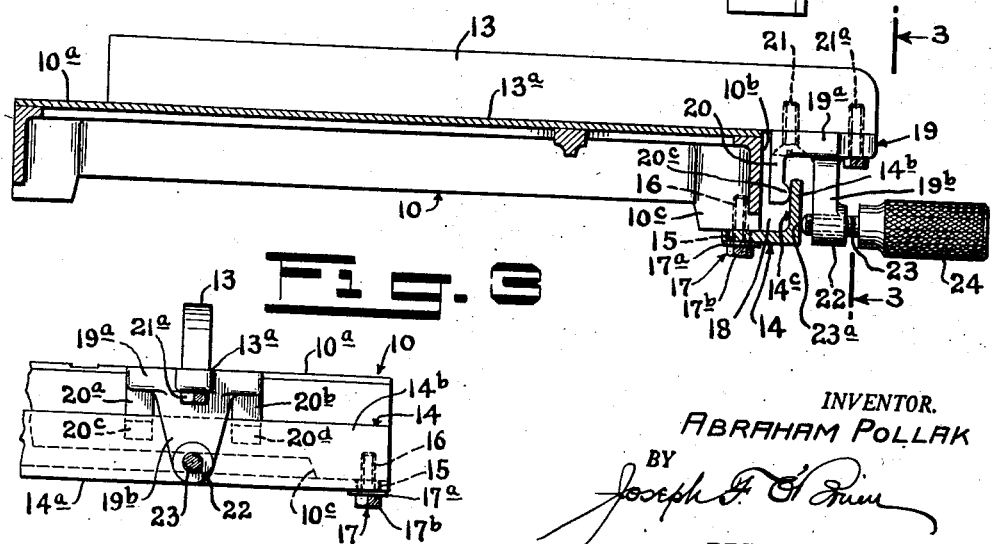
INVENTOR.
ABRAHAM POLLAK
BY
ATTORNEY

Patented Sept. 8, 1953

2,651,337

UNITED STATES PATENT OFFICE 2,651,337

RIP FENCE FOR SAW TABLES AND MOUNTINGS THEREFOR

Abraham Pollak, Linfield, Pa.

Application January 24, 1949, Serial No. 72,511

2 Claims. (Cl. 143—174)

This invention relates to improvements in saw tables and rip fences therefor, and particularly relates to saw tables having means for positioning and securing a rip-fence thereto.

One of the objects of this invention is to provide a saw table with a rip fence of the conventional type provided with leverage-applying bracket connected to the bottom surface at one end thereof by the use of which the rip fence may by a simple manual operation, and preferably by the operation of clamping the rip fence in place at the front edge of the table, be pressed against the top surface of the table with such pressure that said fence will, for all practical and useful purposes, be immovably retained in position until manually released.

Another object of my invention is to mount on the edge of a saw table a guide rail and to securely and immovably fasten to one end of a rip-fence member a clamping bracket having means adapted, upon a simple clamping manipulation thereof on the guide rail, to cause a leverage pressure to be applied with such great force between the bottom surface of the fence rail and the top surface of the table that the fence-rail will be firmly and immovably held in a suitable fixed position on said table.

Still another object of my invention is to utilize a clamping bracket of the type hereinabove specified that will not only apply a strong downwardly-directed leverage pressure between the bottom surface of the fence rail and the top surface of the table, but will also in the single manual operation move the fence rail into a position at a right angle to a flange of a guide-rail or other part on which it is mounted to cause the fence to extend parallel to the saw blade.

Still another object of my invention is in a rip fence arrangement to provide an adjustable mounting between the guide rail and table whereby clearance may, if desired, be procured at the back of the saw blade or otherwise between the rip-fence member and the saw by an adjustment of said guide-rail in relation to the table and without affecting the strong leverage action of the clamping device.

With these and other objects in view, the invention comprises the combination of members and arrangement of parts so combined as to coact and cooperate with each other in the performance of the functions and the accomplishment of the results herein contemplated, and comprises in one of its adaptations the species or preferred form illustrated in the accompanying drawings, in which:

Fig. 1 is a view in plan of a saw table embodying my invention;

Fig. 2 is a section on the line 2—2 of Fig. 1, looking in the direction of the arrows; and Fig. 3 is a fragmentary view in front elevation on the line 3—3 of Fig. 1, looking in the direction of the arrows.

Referring now to these drawings which illustrate a preferred embodiment of my invention, 10 indicates a conventional saw table having a conventional flat top surface $10^a$ and an opening or slot 11 for a saw blade 12 disposed at substantially a right angle to the front edge $10^b$ of the table 10. The saw-blade extends through said slot or opening 11 and is suitably mounted and rotatably driven from any suitable source of power, not shown.

In accordance with my invention a rip fence 13 is mounted by a leverage-applying mounting bracket 19 at the front edge $10^b$ of the saw table 10, extends inwardly from said front edge and has a flat bottom surface $13^a$ resting flatly against and on said top surface $10^a$.

My leverage-applying bracket 19 is rigidly and suitably connected to an end of the rip-fence that extends beyond the front edge $10^b$ of the table and said bracket 19 comprises a body portion $19^a$ which is connected with the rip fence 13, a fulcrum-arm 20 having a fulcrum portion and a pressure-applying arm extending to a leverage-applying position in relation to the fulcrum portion of the fulcrum arm. Said leverage-applying bracket 19 is mounted on a bracket-mounting element arranged in fixed relationship to the front edge $10^b$ of the saw blade in position to apply a downward or vertical leverage-induced pressure on the rip fence against the top surface of the table and by the use of such leverage, I am enabled to provide on the saw table a rip fence that will be held rigidly and securely on said table. As shown, an L-shaped guide-rail 14 formed of an angle iron, as illustrated, is mounted to extend along said front edge $10^b$, and in the embodiment shown the said member 14 is provided in the horizontal flange $14^a$ thereof with holes 15, and the table 10 is provided with corner blocks $10^c$ provided with vertically disposed threaded bores 16 and the guide member 14 is bolted and firmly mounted by bolts 17 in the blocks $10^c$ and extends along the front edge of the table with the flange $14^b$ disposed substantially in parallelism with the said front edge but spaced therefrom to provide a space 18 between the inner surface $14^c$ of the flange $14^b$ and front edge of the table $10^b$.

In the embodiment of my invention shown, I mount on the vertical flange 14<sup>b</sup> of the guide member 14 the pressure-applying bracket 19 which, as shown, has its body portion 19<sup>a</sup> securely fastened to the bottom surface 13<sup>a</sup> of the rip fence 13 by a screw 21 and bolt 21<sup>a</sup>. Said bracket 19 is mounted to straddle the flange 14<sup>b</sup> with the body portion 19<sup>a</sup> extending transversely across said flange, a fulcrum member 20 contacting the inner surface 14<sup>c</sup> of said flange 14<sup>b</sup> and a pressure-applying arm 19<sup>b</sup> engaging the opposite surface thereof. In the form of the invention illustrated, the arm 19<sup>b</sup> embodies a bearing 22 within which a pressure-applying screw 23 is mounted and said screw 23 is turned by a manually operable handle 24 to apply a leverage pressure on the body portion of the bracket and on the rip fence to which it is connected.

In the preferred form of my invention, the fulcrum member 20 is split and composed of separated fulcrum parts 20<sup>a</sup>—20<sup>b</sup> having fulcrum-contact portions 20<sup>c</sup> and 20<sup>d</sup>. As will be clearly seen from an examination of Figs. 2 and 3, the fulcrum member 20 contacts the flange 14<sup>b</sup> at a point which is spaced on the flange 14<sup>b</sup> above the contact point 23<sup>a</sup> at which the screw 23 engages the outer surface of said flange 14<sup>b</sup> and therefore as the flange is fixed, upon the application of pressure by the screw 23, a leverage action on the bracket and rip fence about the fulcrum points 20<sup>c</sup>—20<sup>d</sup> will be produced, and it will be apparent that upon the turning of the handle 24 the screw 23 will cause a strong leverage action to be applied through the L-shaped clamping bracket 19 and a downward pressure will, through said clamping bracket 19, be applied on the under surface 13<sup>a</sup> of the rip fence 13. This pressure, because of the leverage action between the point 23<sup>a</sup> and the fulcrums 20<sup>c</sup>—20<sup>d</sup> will press the bottom surface 13<sup>a</sup> of the fence rail with such great firmness against the top surface 10<sup>a</sup> of the table 10 as to cause the rip fence to be rigidly held in place against any side pressure to which it may be subjected in use. The high pressure produced is due to the positioning of the pressure-applying point 23<sup>a</sup> below the contact points of the fulcrums 20<sup>c</sup> and 20<sup>d</sup>.

The positioning of the dual fulcrum points 20<sup>c</sup> and 20<sup>d</sup> in alignment or parallelism with each other and the placing of the power-applying point 23<sup>a</sup> of the screw 23 between the aligned parallel fulcrums will also upon the initial tightening up of the screw produce a true aligning of the fence rail 13 at right angles to the flange 14<sup>b</sup> of the guide rail 14, and in view of the positioning of this guide rail 14 in substantial parallelism with the front edge 10<sup>b</sup> of the table, the fence rail will be moved into a position at substantially right angles thereto and parallel to the saw slot and saw 12.

At times, a clearance is desirable at the back of the saw blade or otherwise between the rip fence member and the saw, and in the present embodiment of my invention, I provide clearance in the hole 15 around the bolt 17. A washer 17<sup>a</sup> is arranged between the head 17<sup>b</sup> of the bolt and the surface of the horizontal flange 14<sup>a</sup> of the guide rail 14. In this way, by merely loosening one of the bolts 17 the guide rail may be adjusted to align the rip fence with the saw blade at any desirable angle.

It will be apparent from the above that I am enabled to provide a rip fence which will be firmly and rigidly mounted on the saw table and that this may be accomplished by a simple manipulation conventionally used for clamping the fence rail to a guide rail and that this leverage action is applied simultaneously with the clamping of the fence rail to the table by its bracket. It will be seen also that the fence rail may be instantly disconnected by a simple operation and lifted off the table, if desired.

Operation of the device will be clear from the above description.

Having described my invention, I claim:

1. In a rip fence for saw tables and mounting therefor, a support comprising a table having a substantially flat top surface and provided at one edge thereof with a fixed bracket-mounting element having a vertical flange extending in parallel alignment with the edge of the saw table, a rip fence lying on said top surface and having its end portion projecting beyond said table edge and above said flange, a leverage-applying fence-mounting bracket of channel shape comprising a body portion connected with the bottom edge of said projecting end of said rip fence, a pair of integral fulcrum-arms disposed at one side of and extending downwardly from said body portion, the members of said pair being spaced from each other, said fulcrum arms each having an integral fulcrum portion adapted in operative position to provide spaced contacts with one side of said vertical flange, and an integral pressure-applying bearing arm at the opposite side of said body portion having a screw-threaded bore provided with a screw and positioned intermediate the members of said pair of integral fulcrum arms and their contact portions, said bore and screw being also positioned to extend in a plane that is spaced vertically in relation to said fulcrum contact portions to cause said bore and screw to assume a leverage-applying position in relation to said fulcrum-contact portions, whereby pressures may be applied through said connected body portion to said projecting end of the rip fence to force said rip fence against the top surface of the table and simultaneously to produce a horizontal aligning of the rip fence with the saw blade.

2. In a rip fence for saw tables and mounting therefor as claimed in claim 1 in which said integral pressure-applying bearing arm and screw extend to a leverage applying position below said dual fulcrum contact portions in vertical relationship thereto and are disposed centrally between said dual fulcrum contact portions and equidistant from each of them so as to form in relation to said fulcrum contact portions the apex of an isosceles triangle, whereby movement of said screw will cause a conjoint movement of the rip fence to a position at a right angle to the edge of the saw table, in alignment with the saw blade and also produce a frictional locking contact of the rip fence with the surface of the saw table.

ABRAHAM POLLAK.

References Cited in the file of this patent

UNITED STATES PATENTS

| Number | Name | Date |
|---|---|---|
| 221,804 | Gordon | Nov. 18, 1879 |
| 1,082,521 | Hoepfner | Dec. 30, 1913 |
| 1,790,288 | Tautz | Jan. 27, 1931 |
| 2,009,044 | Davis | July 23, 1935 |
| 2,075,282 | Hedgpath | Mar. 30, 1937 |
| 2,166,703 | Boice | July 18, 1939 |
| 2,267,937 | Mattison | Dec. 30, 1941 |